Dec. 20, 1960     G. DOMMANN ET AL     2,965,217
DRIVE FOR DOUBLE-CHAIN SCRAPER CONVEYOR
Filed Jan. 26, 1959

United States Patent Office 2,965,217
Patented Dec. 20, 1960

2,965,217

DRIVE FOR DOUBLE-CHAIN SCRAPER CONVEYOR

Gunther Dommann and Wulff Rösler, Altlunen, Germany, assignors to Gewerkschaft Eisenhutte Westfalia, Wethmar, near Lunen, Westphalia, Germany, a corporation of Germany Filed Jan. 26, 1959, Ser. No. 789,213

Claims priority, application Germany Jan. 31, 1958

10 Claims. (Cl. 198—203)

The present invention relates to a double-chain scraper conveyor universal drive means, and more particularly to such a drive means having independent coupling elements capable of synchronous rotation.

Conventional double-chain scraper conveyors, comprise a suitably mounted rotatable endless double-chain carrying spaced scraper members therebetween. The double-chain is mounted at either end of the conveyor on suitable rotating members, the driving rotating member at one end being usually powered by a separate transmission means adjacent each side of said driving rotating member. In the ordinary operation of these conventional double-chain scraper conveyors, disruptions often occur because the drive shafts of the transmission means on either side of the driving rotating member, which should have a common axis, are occasionally displaced with respect to each other so that their axes of rotation become parallel to one another or intersect one another at an angle. Consequently, one of the chains may lag somewhat with respect to the other, causing the scrapers connected therebetween to assume an angle with respect to the longitudinal direction of the conveyor other than normal. Eventually, this condition leads to undesirable demounting of one or both of the chains from the rotating member.

It is an object of the present invention to overcome the foregoing disadvantage of known conveyors and to provide a double-chain scraper conveyor drive means having independent coupling elements which ensure synchronous rotation of both chains even with displacement of the axes of the driving shafts of the transmission means with respect to one another.

Figure 1:
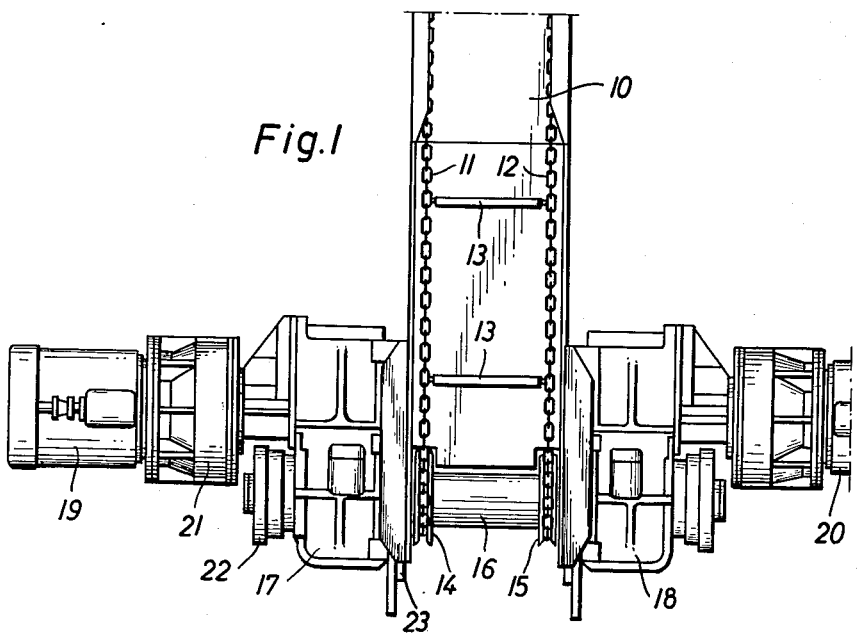
Figure 2:
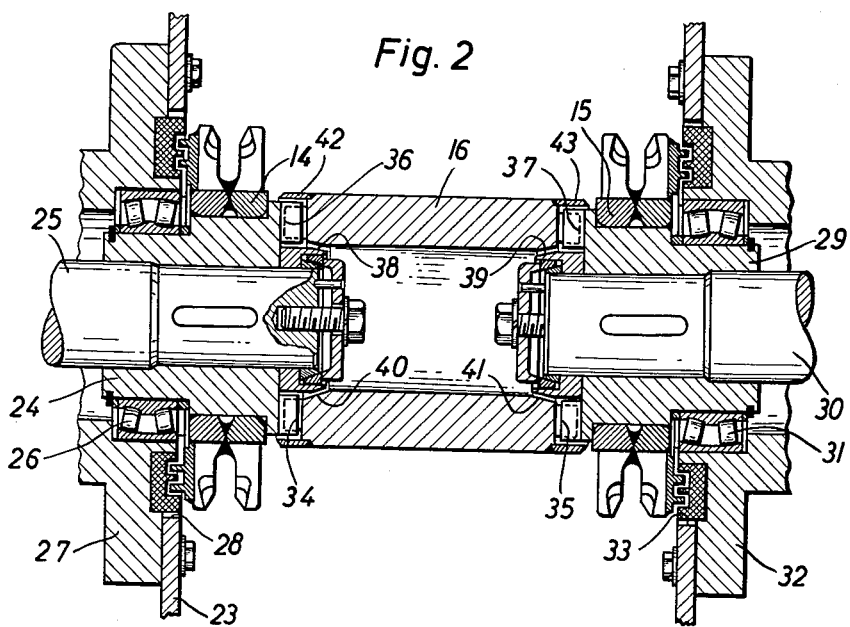

Other and further objects of the invention will become apparent from a study of the within specification and accompanying drawings in which:

Fig. 1 is a top view of a double drive embodiment for a double-chain scraper conveyor in accordance with the invention; and Fig. 2 is an enlarged partial vertical sectional view of the double drive construction in accordance with the invention showing a pair of chain sprockets rotatably interconnected by a separate coupling drum means.

It has been found in accordance with the present invention that by constructing the chain driving rotating member of three separate elements, comprising a pair of chain sprockets interconnected by means of a coupling drum, displacement of the driving shafts in engagement with said sprockets will not cause corresponding displacement of the chain-carried scrapers nor demounting of the chains.

The chain sprockets are separately supported for rotation with said driving shafts and are in synchronous rotational engagement with said interconnecting drum by means of suitable coupling means. In the construction according to the invention, the sprockets may be somewhat displaced with respect to their normally common axis during operation without corresponding displacement of the scrapers or demounting of the chains. The coupling means preferably comprise teeth disposed on the medial face of each of the sprocket carrying means rotatably engaging corresponding teeth disposed on either end of said drum. To permit a certain degree of swiveling of the sprockets on the driving shafts, a medial frusto-conical extension or crown is provided on each sprocket carrying means which is guided within a suitably shaped concave recess in either side of said drum.

It is preferred that the sprockets be driven by separate drive shafts mounted on either side of the conveyor frame although a drive shaft on only one side may also be used. Upon assembly, the drive shafts are passed through openings in the frame for connection with the sprockets. Where only unilateral drive means are contemplated, the opposite sprocket can be suitably rotatably supported on a stub shaft attached to the conveyor frame located at that side.

In place of the coupling drum above described, the means interconnecting said sprockets in synchronous rotation may comprise one or more radially mounted bars or vanes secured to one another for rotating movement and coupled at their ends to each of said sprockets.

Referring to the drawings, in Fig. 1 is shown a conveyor having a conveyor floor 10 limited at either side by laterally extending side walls. A conveyor path is thereby defined along which the rotating double-chain scraper travels. The double-chain scraper includes a pair of laterally guided endless chains 11 and 12, interconnected by spaced scrapers 13 which travel along the conveyor path during operation carrying material therealong which is deposited at the forward end of the conveyor. The chain scraper travels under floor 10 returning to the receiving or input end of the conveyor by means, not shown.

The driving means for the rotating scraper chains 11 and 12 is effected by rotating sprockets 14 and 15, respectively. Located between sprockets 14 and 15, and interconnected for rotation therewith, is discharge drum 16 over which the material, being slidingly conveyed along floor 10 by scrapers 13, is discharged at the forward end of the conveyor.

Sprockets 14 and 15 are mounted separately from one another on driving shafts 25 and 30 which rotate together in the same direction. Driving shafts 25 and 30 are suitably connected via conventional gears 17 and 18 to motors 19 and 20 respectively. As may be seen, motor 19 is placed in driving engagement with gear 17 by means of hydraulic clutch 21 and is disengaged by means of clutch 22. A similar arrangement is provided for motor 20. Gears 17 and 18 transmit the driving power to sprockets 14 and 15 by means of said shafts 25 and 30 respectively, which pass through corresponding openings in the sides of the conveyor frame 23. The motor, clutch and gear assemblies are conveniently mounted on frame 23.

As shown in Fig. 2, sprocket 14 is fastened via bushing 24 to shaft 25 which is supported by the same bushing on bearing 26. Bearing 26 is supported by connecting flange 27 which forms a part of the housing of gear 17 secured to frame 23, and simultaneously closes the opening 28 in the wall of frame 23. Opening 28 is preferably of a diameter slightly larger than that of sprocket 14 for easy insertion of the sprocket upon assembly. Sprocket 15 is fastened in the same way via bushing 29 to shaft 30 which is supported by the same bushing on bearing 31. Bearing 31 is supported by connecting flange 32 which forms a part of the housing of gear 18 which simultaneously closes the opening 33 in the frame wall. The opening 33 is similarly of a diameter slightly larger than that of sprocket 15 for easy insertion of the sprocket.

Bushings 24 and 29, at their centermost sides, each bear coupling teeth 34 and 35, respectively, while tubular drum 16 bears corresponding teeth 36 and 37, respectively, on each side thereof. Teeth 36 and 37 intermesh with teeth 34 and 35 to couplingly engage drum 16 with bushings 24 and 29 on which sprockets 14 and 15 are carried, whereby upon rotation of shafts 25 and 30, drum 16 and sprockets 14 and 15 will turn in synchronous unison without the possibility of any lag of either chain taking place.

This is further ensured by advantageously providing slightly conical crown end surface portions 38 and 39 on shafts 25 and 30. Drum 16 on each inside end surface radially inwardly with respect to said teeth 36 and 37 is correspondingly provided with concave conical recess portions 40 and 41 in which conical end surface portions 38 and 39 are loosely received. Since teeth 34 and 35 will have sufficient play with teeth 36 and 37 during rotation, drum 16 may be swiveled in any direction with respect to driving shafts 25 and 30 without pinching occurring, even where the shafts are not aligned precisely axially with respect to one another. Thus, radial or angular displacement of one or both of the shafts with respect to the common axis is of no moment using the construction of the invention, although heretofore such displacement was a major drawback in conventional double-chain scraper conveyor equipment.

Hence, in accordance with the construction of the present invention, the discharge of material conveyed by the double-chain scraper means over the forward end is in no way impaired by the drum universal coupling between the two shafts. As a further feature, the end portions of the drum containing the coupling teeth are provided with rings 42 and 43, respectively, which cover these teeth as well as those extending from the bushings while not impairing the desired mobility of the drum in cooperation with the shafts and bushings at either side.

While the foregoing specification and accompanying drawings have been set forth for the purpose of illustration, it will be obvious to those skilled in the art that various modifications and changes may be made without departing from the spirit and scope of the invention which is to be limited only by the scope of the appended claims.

We claim:

1. In a double-chain scraper conveyor, the improvement which comprises a drive coupling including a pair of normally coaxial spaced rotatably mounted sprocket means for driving the double-chain scraper of the conveyor, each of said sprocket means having coupling means adjacent the space therebetween, a rotatable interconnecting means disposed in said space, said interconnecting means having corresponding coupling means at each end thereof adjacent to and in engagement with the sprocket coupling means and cooperating therewith, said interconnecting means allowing limited displacement of said sprocket means with respect to the normal coaxis thereof, whereby upon rotation of at least one of said sprocket means, said interconnecting means and the other of said sprocket means will rotate therewith in synchronous engagement.

2. Improvement according to claim 1 wherein said sprocket means are provided with slightly conical medial end portions and said interconnecting means is provided with concave recess end portions, said medial end portions being capable of being guidably received within the corresponding concave recess end portions, whereby said interconnecting portion may be swiveled in any direction with respect to the axes of rotation of said sprocket means, even where one of said axes is displaced with respect to the other.

3. Improvement according to claim 1 wherein said sprocket means are carried on separate rotatable shaft means mountable on a double-chain scraper conveyor.

4. Improvement according to claim 1 wherein the sprocket coupling means are teeth projecting into the space between said sprocket means and the interconnecting coupling means are corresponding teeth rotatably engaging the sprocket coupling teeth.

5. Improvement according to claim 1 wherein an annular extension is provided at each end of the interconnecting means which projects across the cooperating coupling means in engagement.

6. Improvement according to claim 1 wherein said interconnecting means is of drum configuration.

7. Improvement according to claim 1 wherein said interconnecting means comprises at least one vane means.

8. Improvement according to claim 1 wherein said interconnecting means comprises a plurality of radially extending vanes.

9. In a double-chain scraper conveyor having a conveyor path, an intake end and a discharge end, a double-chain with spaced interconnecting scrapers mounted for rotation thereon, and shaft means for driving said double-chain, the improvement which comprises a pair of normally coaxial spaced rotatable sprocket means disposed on said shaft means at each side of said path and at the discharge end thereof, said sprocket means being capable of driving said double-chain, each of said sprocket means having coupling means facing each other in the space therebetween, a rotatable interconnecting means disposed in said space, said interconnecting means having corresponding coupling means at each end thereof adjacent to and in engagement with the sprocket coupling means and cooperating therewith, said interconnecting means allowing limited displacement of said sprocket means with respect to the normal coaxis thereof, whereby upon rotation of said shaft means, said sprocket means and said interconnecting means will rotate therewith in synchronous engagement even where one of said sprocket means is so displaced.

10. In a double-chain scraper conveyor having a conveyor path, an intake end and a discharge end, a double-chain with spaced interconnecting scrapers mounted for rotation thereon, and shaft means for driving said double-chain, the improvement which comprises a pair of normally coaxial spaced rotatable sprocket means disposed on said shaft means at each side of said path and at the discharge end thereof, said sprocket means being capable of driving said double-chain, each of said sprocket means having coupling teeth extending into the space therebetween, a rotatable interconnecting drum means disposed in said space, said interconnecting means having corresponding coupling teeth at each end thereof adjacent to and in engagement with the sprocket coupling teeth and cooperating therewith, an annular extension on each end of the interconnecting means disposed across the cooperating coupling teeth in engagement, said sprocket means being provided with slightly conical medial end portions and said interconnecting means being provided with concave recess end portions, said medial end portions being guidably received within the corresponding concave recess end portions, said interconnecting means allowing limited displacement of said sprocket means with respect to the normal coaxis thereof, whereby upon rotation of said shaft means, said sprocket means and said interconnecting means will rotate therewith in synchronous engagement and said interconnecting portion may be swiveled in any direction with respect to the axes of rotation of said sprocket means, even where one of said axes is displaced with respect to the other.

References Cited in the file of this patent

UNITED STATES PATENTS

| | | |
|---|---|---|
| 2,551,735 | Goff | May 8, 1951 |
| 2,743,592 | Nagy | May 1, 1956 |